H. R. NORTON.
APPARATUS FOR INDICATING THE POSITION OF MOVING BODIES.
APPLICATION FILED FEB. 1, 1912.
1,057,261.
Patented Mar. 25, 1913.
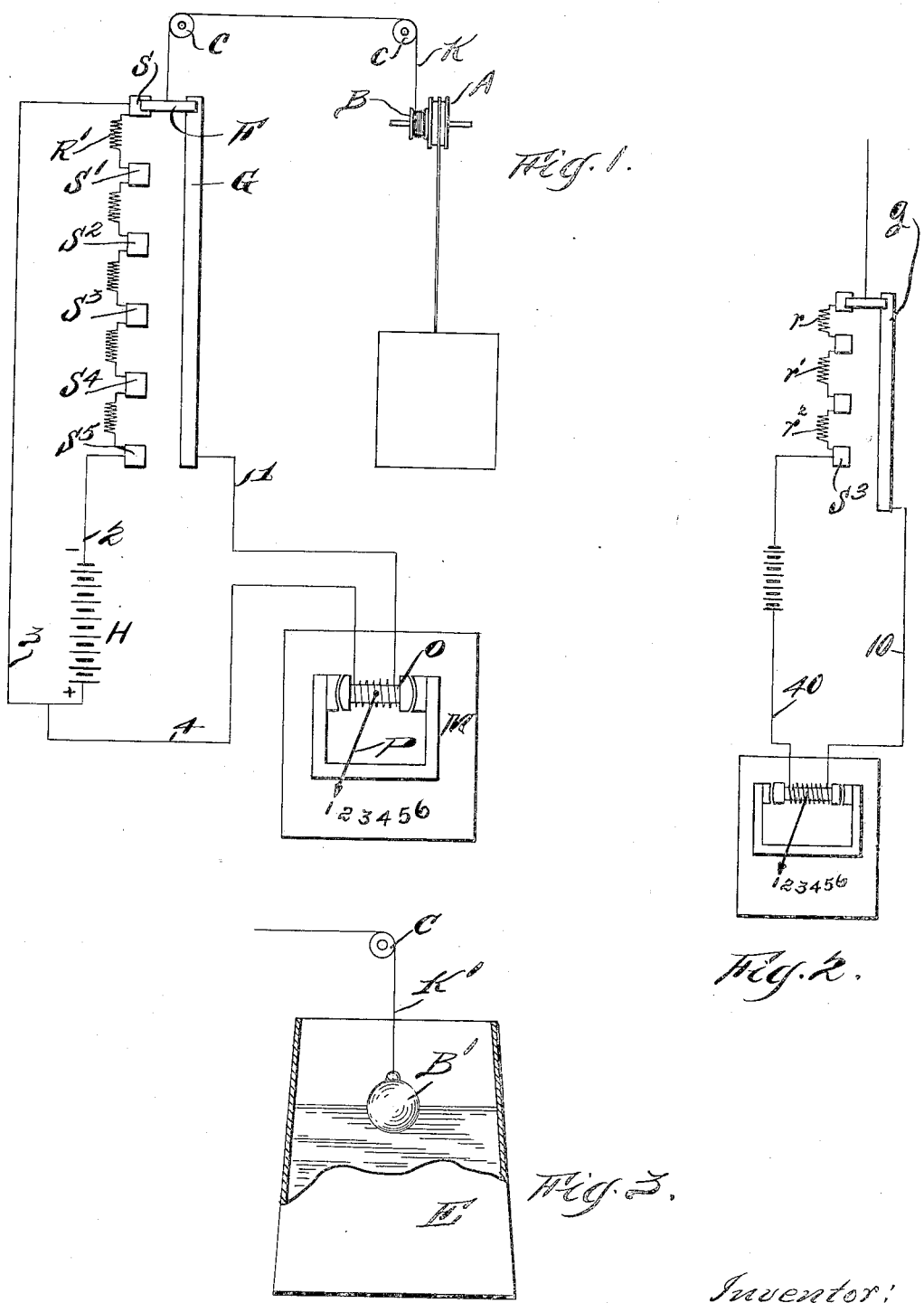

UNITED STATES PATENT OFFICE.

HARRY R. NORTON, OF NEW YORK, N. Y.

APPARATUS FOR INDICATING THE POSITION OF MOVING BODIES.

1,057,261.  Specification of Letters Patent.  Patented Mar. 25, 1913.

Application filed February 1, 1912. Serial No. 674,706.

*To all whom it may concern:*

Be it known that I, HARRY R. NORTON, a citizen of the United States, residing at New York city, New York, have invented certain new and useful Improvements in Apparatus for Indicating the Position of Moving Bodies, of which the following is a clear, full, and exact description.

The object of this invention is to provide an indicating device to indicate at a given place by means of an electric circuit the present position of a moving object, such as an elevator car, a float in a tank of water, or the like.

In carrying out the invention, I provide stationary contacts and a movable contact, the movable contact being connected by suitable transmission mechanism with the movable body, preferably so as to travel a shorter but proportionate distance to the motion of the body, and I provide electrical circuits and connections from the contacts to a suitable measuring instrument of a galvanometer type, carrying a pointer adapted to indicate on a scale the position of the moving body, the movable contact controlling the flow of current or potential to the galvanometer to various degrees according to its position.

The scope of my invention will be pointed out in the claim.

In the accompanying drawings: Figure 1 is a diagrammatic view of my improved device connected with a sheave of an elevator. Fig. 2 is a diagrammatic view of a different circuit connection from that shown in Fig. 1. Fig. 3 is a cross section of a water tank showing how my improved device is adapted to be used in connection with the height of water.

As shown in the accompanying drawings: A is an elevator sheave having a small drum B on its shaft. The cable K passes over the two idler pulleys C, and carries the movable contact F at its free end. The contact F may travel vertically up and down at all times in contact with the terminal strip G, which is connected by a wire 1 with the armature O of a galvanometer.

M is the permanent field of the galvanometer and P, which is adapted to have its end adjacent to the scale, is the pointer. The wire 4 leads from the armature of the galvanometer O to the plus side of a battery H, and also by the wire 3 to the contact S. From the contact S is a resistance R' connecting with the contact S', and so on down a line of small contact blades, from the last of which the current returns by the wire 2 to the minus side of the battery H.

In place of the sheave A, where the device is to measure the height of water in a tank, a float ball B' will be provided for the tank E, from which a cable K' may pass to the movable contact over a sheave C.

As shown in Fig. 1, current will normally flow through the following circuit: battery H, plus wire 3, contact S, S', S², S³, S⁴, S⁵, together with the intermediate resistance, by wire 2 to the minus side of the battery, and when the contact F is in the position shown no difference of potential will exist on the circuit comprising in part wires 1 and 4, and the armature, hence the pointer will remain at the extreme left pointing to the figure 1 on the scale, but upon the movable contact bridging from the strip G to the contact S' a difference of potential will be caused to exist due to the insertion of the resistance R' in the first named circuit sufficient to move the pointer to the next numeral of the scale, and so on until the movable contact reaches the last contact S⁵, which causes the maximum throw of the pointer needle.

In place of the circuit shown in Fig. 1, I may adopt the circuit shown in Fig. 2, in which the contact strip $g$ connects directly with the wire 10 to the galvanometer, and the contact S³ connects with the battery, and from the battery by a wire 40 direct to the galvanometer, the resistances $r'$, $r'$ being inserted as heretofore described. In this instance, as the movable contact moves downwardly it will cut out resistance, and cause a greater flow of current to the galvanometer to effect the motion of the needle.

I claim as my invention:

The herein described device, consisting of a stationary contact strip, a series of contact blocks adjacent thereto, but separated therefrom, a movable contact normally in contact with said stationary contact, and adapted to close the circuit between said stationary strip and any one of said contact blocks, resistances interposed between and connecting said contact blocks, a source of electrical energy in circuit with the extreme end contact blocks and said resistances, and an automatically operated galvanometer connected in parallel with the electrical circuit for said contact blocks, said stationary contact strip being a part of the circuit for said galvanometer.

Signed at New York city, New York, this 30th day of January, one thousand nine hundred and twelve.

HARRY R. NORTON.

Witnesses:
 MABEL DITTENHOEFER,
 FRED FRANCIS WEISS.